United States Patent
Gaynor et al.

(10) Patent No.: US 11,238,482 B1
(45) Date of Patent: Feb. 1, 2022

(54) METHOD AND SYSTEM FOR MANAGING CLEARANCE ITEMS

(71) Applicant: Target Brands, Inc., Minneapolis, MN (US)

(72) Inventors: James Gaynor, Lawrence, PA (US); Luyen Le, Minneapolis, MN (US); Saibal Bhattacharya, San Mateo, CA (US); Brian Wongchaowart, Pittsburgh, PA (US); Hamidreza Badri, Los Angeles, CA (US); Elif Tokar-Erdemir, Plymouth, MN (US); Xiao Pu, San Jose, CA (US)

(73) Assignee: TARGET BRANDS, INC., Minneapolis, MN (US)

( * ) Notice: Subject to any disclaimer, the term of this patent is extended or adjusted under 35 U.S.C. 154(b) by 30 days.

(21) Appl. No.: 16/530,064

(22) Filed: Aug. 2, 2019

(51) Int. Cl.
*G06Q 30/02* (2012.01)
*G06Q 10/08* (2012.01)

(52) U.S. Cl.
CPC ..... *G06Q 30/0223* (2013.01); *G06Q 10/0875* (2013.01); *G06Q 30/0202* (2013.01); *G06Q 30/0235* (2013.01)

(58) Field of Classification Search
CPC ........... G06Q 30/0223; G06Q 30/0202; G06Q 30/0235; G06Q 10/0875
USPC ...................................... 705/7.35, 7.29, 7.31
See application file for complete search history.

(56) References Cited

U.S. PATENT DOCUMENTS

| | | | |
|---|---|---|---|
| 7,379,890 B2 | 5/2008 | Myr et al. | |
| 7,424,440 B1 | 9/2008 | Gupta et al. | |
| 7,912,748 B1 * | 3/2011 | Rosenberg | G06Q 10/087 705/7.35 |
| 7,979,299 B1 * | 7/2011 | Mehta | G06Q 30/0201 705/7.29 |
| 8,000,996 B1 | 8/2011 | Sanli et al. | |
| 10,169,660 B1 * | 1/2019 | Ren | G06Q 10/087 |
| 2005/0096963 A1 | 5/2005 | Myr et al. | |
| 2008/0077459 A1 | 3/2008 | Desai et al. | |
| 2009/0327037 A1 | 12/2009 | Ng et al. | |
| 2014/0149183 A1 | 5/2014 | Liu et al. | |
| 2015/0120394 A1 | 4/2015 | Bhattacharya et al. | |
| 2018/0285902 A1 * | 10/2018 | Nazarian | G06Q 10/087 |

FOREIGN PATENT DOCUMENTS

WO    WO-2010091438 A1 *   8/2010  ............. G06Q 30/02

OTHER PUBLICATIONS

Lisa Schwarz, The Definitive Guide to Perpetual Inventory, 2019 (Year: 2019).*
Nicole Leinbach Reyhle, The Top Retail Markdown Strategies for 2020, 2019 (Year: 2019).*

* cited by examiner

*Primary Examiner* — Tarek Elchanti
(74) *Attorney, Agent, or Firm* — Merchant & Gould P.C.

(57) ABSTRACT

Methods and systems for generating an optimal clearance schedule for inventory items in a retail enterprise. A method includes accessing historical sales data for a plurality of inventory items in a department of a retailer. A selection of an item is received and a set of possible discount schedules for the item are generated. Each schedule includes a set of prices and a price duration. A forecasting tool provides a sales performance of the item based on the historical sales data. An optimal clearance schedule is selected from the possible discount schedules.

19 Claims, 12 Drawing Sheets

$$y_t = \begin{cases} 1: \sum_j jx_{jt} - \sum_j jx_{j,t-1} > 0 \\ 0: \sum_j jx_{jt} - \sum_j jx_{j,t-1} = 0 \end{cases};$$

$$100 \times y_t \geq \sum_j (jx_{jt} - jx_{j,t-1})$$
$$100 \times y_t \leq M \times \sum_j (jx_{jt} - jx_{j,t-1})$$
$$y_t \in \{0,1\}$$

FIG. 12

METHOD AND SYSTEM FOR MANAGING CLEARANCE ITEMS

TECHNICAL FIELD

The present disclosure relates generally to methods and systems for managing a clearance schedule for inventory items within a retail enterprise.

BACKGROUND

Predicting sales for a retail enterprise system is useful to maximize revenue. At its most basic, forecasting sales may involve simply estimating future sales using historical sales data for similar inventory items. In more complex situations, historical sales data can be can be further analyzed to predict future sales using a variety of statistical models and algorithms. Such models and algorithms typically rely on past data including past sales of the same item as well as changes in circumstances between those past sales and a forecast sales period to predict future sales.

In the case of clearance items, it can be difficult to accurately predict sales of the item based on past sales of the same item. Because clearance items are items that will not be restocked, item demand changes over time, since selection for the item may decrease. In the case of apparel, specific sizes or colors may become unavailable over time, and as such demand will decrease for the remaining inventory. Additionally, because the goal for clearance items is not to maximize a profit margin on the item but instead to simply recoup as much revenue as possible on remaining stock, it may be difficult to develop an accurate model for pricing of items designated as clearance items. This may be particularly difficult where multiple clearance items have different likely demand lifespans (e.g., comparing a seasonal item to a general use item). This is further complicated for retailers offering a multitude of products, e.g. millions. There is a need for improved methods of determining a clearance schedule for inventory items within a retail enterprise.

SUMMARY

In summary, the present disclosure relates to methods and systems for managing clearance inventory items within an enterprise system. Various aspects are described in this disclosure, which include, but are not limited to, the following aspects.

In a first aspect, a system for managing clearance inventory items of an enterprise system is disclosed. The system comprises a computing system including a processor, and a memory communicatively coupled to the processor, the memory storing instructions executable by the processor, including a clearance scheduling tool which, when executed, causes the computing system to complete the following steps. First, historical sales data including sales data for product markdowns for a plurality of inventory items in a department of a retailer is received. The department includes a selection of inventory items including the plurality of inventory items. In turn, a selection of an inventory item for clearance is received, the inventory item is included in the selection of inventory items of the department, and the inventory item is different from the plurality of inventory items. In turn, a set of possible discount schedules for the item is generated, each possible discount schedule of the set defines a set of prices and associated price durations. The prices represent progressive, decreasing discounts between a retail price and a predetermined sales level based at least in part on a salvage value of the inventory item. For at least some of the possible discount schedules, the discount schedule is provided to a sales forecast tool that provides a sales performance of the item based on the historical sales data for the plurality of inventory items in the department. Finally, an optimal selloff schedule is selected for the inventory item from among the possible discount schedules based on comparison of the sales performance of the possible discount schedules.

In another aspect, a method of determining an optimal selloff schedule for a clearance inventory item is described. The method includes accessing, at a clearance scheduling tool, historical sales data including sales data for product markdowns for a plurality of inventory items in a department of an enterprise system. The department includes a selection of inventory items including the plurality of inventory items. The clearance scheduling tool receives a selection of an inventory item for clearance, the inventory item is included in the collection of inventory items of the department, and the inventory item is different from the plurality of inventory items. A set of possible discount schedules is generated for the item, each possible discount schedule of the set defines a set of prices and associated price durations. The prices represents progressive, decreasing discounts between a retail price and a predetermined sales level based at least in part on a salvage value of the inventory item. For at least some of the possible discount schedules, the discount schedule is provided to a sales forecast tool that provides a sales performance of the item based on the historical sales data for the plurality of inventory items in the department. An optimal selloff schedule is selected for the inventory item from among the possible discount schedules based on comparison of the sales performance of the possible discount schedules.

Yet another aspect includes a system for managing clearance inventory items of an enterprise system. The system comprises at least one computing system comprising a processor and a memory communicatively coupled to the processor, the memory storing instructions executable by the processor, including a clearance scheduling tool which, when executed, causes the computing system to do the following. Historical sales data including sales data for product markdowns for a plurality of inventory items in a department of a retailer is received. The department includes a collection of inventory items including the plurality of inventory items. A selection of an inventory item for clearance is received alongside a clearance program type and a clearance program duration. The inventory item is included in the collection of inventory items of the department, and the inventory item is different from the plurality of inventory items. A set of possible discount schedules for the item is generated, each possible discount schedule of the set defines a set of prices and associated price durations. The prices represent progressive, decreasing discounts between a retail price and a predetermined sales level based at least in part on a salvage value of the inventory item. The price durations aggregate to not exceed the clearance program duration. In turn, a subset of the possible discount schedules is determined as being possible candidate discount schedules. For each of the possible candidate discount schedules, the possible candidate discount schedule is provided to a sales forecast tool that provides a sales performance of the item based on the historical sales data for the plurality of inventory items in the department. An optimal selloff schedule for the inventory item is selected from among the possible candidate discount schedules by maximizing revenue performance of the possible candidate discount schedules.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 12 is an example equation showing linearized logical constraints.

DETAILED DESCRIPTION

Figure 1:
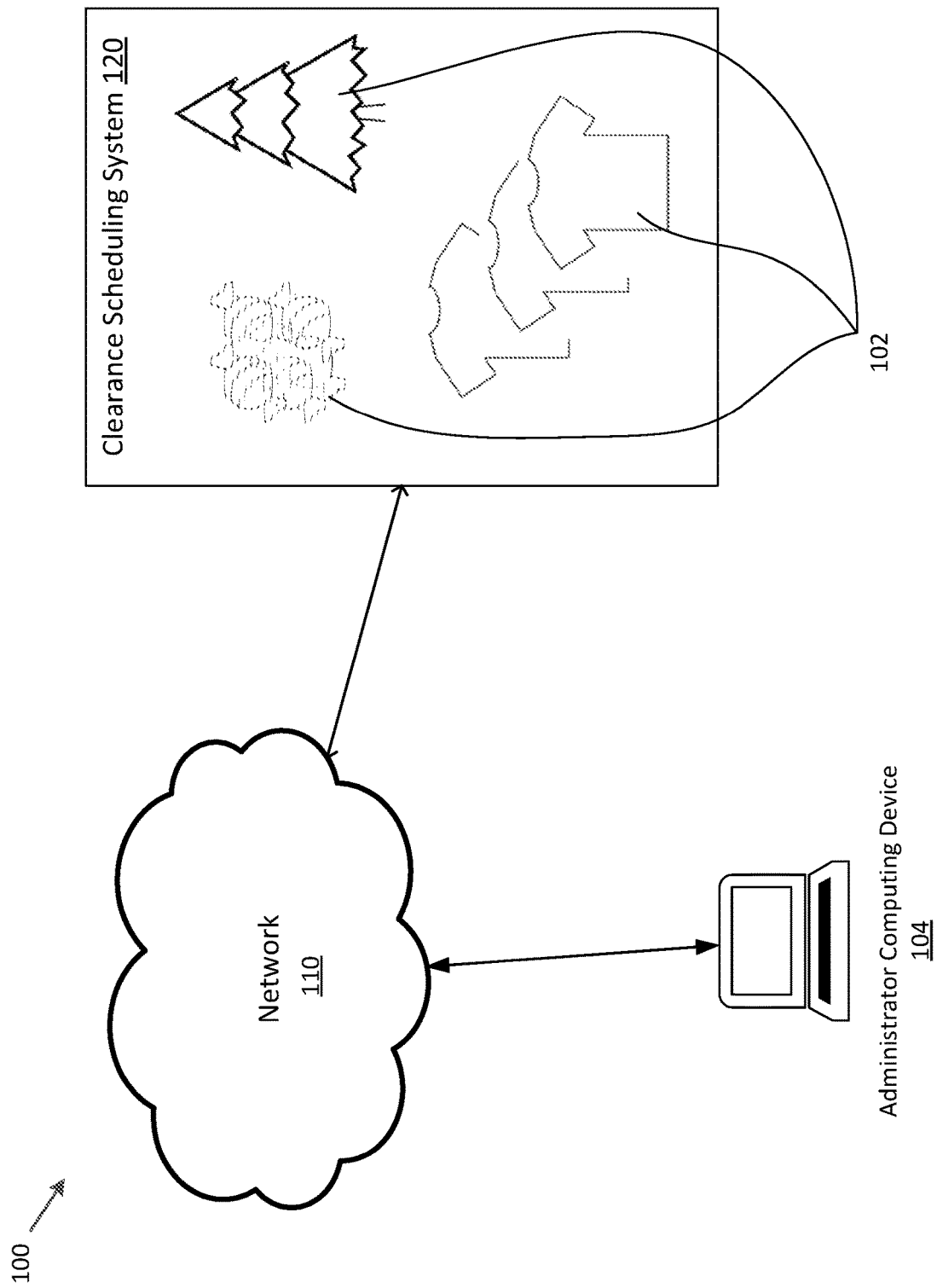
FIG. 1 illustrates an environment including a clearance scheduling system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

In general, the present disclosure relates to methods and system for determining an optimal clearance schedule for an inventory item within an enterprise system. The objective of any clearance strategy is to clear out discontinued products by a predetermined date and to optimize a predetermined variable. Predetermined variables are selectable from maximizing revenue, maximizing profit, and minimizing lost costs. To accomplish this, prices are reduced in order to drive inventory levels towards zero by the predetermined date.

A clearance scheduling system as described herein utilizes at least a clearance scheduling tool that uses a forecasted demand and pricing to provide a recommended clearance schedule that is set to maximize a predetermined variable, such as revenue, and minimize the remaining inventory by the predetermined date. The clearance schedule includes a set of prices and an associate time duration. The optimization tool uses an output from a forecast tool to calculate the predetermined variable value at each markdown percentage and recommends a markdown plan that optimizes the predetermined variable value.

When an inventory item is selected to be placed on clearance, the costs associated with that inventory item are assumed to be sunk costs. The inventory has already been purchased and must be cleared out. There is no way to reduce inventory levels by returning product to the vendor. Therefore, the primary considerations, from a profit maximizing point of view, are maximizing revenue, minimizing incremental costs of the clearing the item, and minimizing opportunity costs. Additionally, a planner may wish to minimize salvage (e.g., the left over items after all sales are made); in some instances, some salvage costs are desirable and may be recouped (e.g., based on a salvage value of the item if not sold).

Maximizing revenue of the clearance inventory item is defined as product of adding the sales of the inventory item while on clearance and the salvage revenue, and subtracting clearance costs. Clearance costs include shipping costs, distribution costs, and salvage sticker costs. The sale of inventory items takes into account the salvage value, because inventory items are not sold at a price less than the salvage value. Costs of clearing the inventory item includes shipping costs from flow centers to customers or distributing inventory items from distribution centers to retail stores before the clearance program starts. Opportunity costs include costs associated with the space required to clear the product by depleting inventory on hand by the predetermined date.

A retail enterprise system of the present disclosure includes retail stores, such as brick-and-mortar stores, as well sales made online. In some examples, the clearance scheduling system described herein may be adapted to all, or only a portion of the overall retail organization. For example, in some example implementations, the clearance scheduling system described herein is particularly adapted to and applied to an online sales environment. As such, the same system, or a different system (or scheduling algorithm) may be implemented for sales via other channels (e.g., for in-store sales).

FIG. 1 illustrates an example environment 100 in which inventory items 102 within a retail enterprise system are placed on clearance. The clearance schedule is determined by a clearance scheduling system 120.

The clearance scheduling system 120 is connected to an administrator computing device 104 via a network 110. The administrator computing device 104 is accessible by users who are representatives within the retail enterprise determining which inventory items are to be placed on a clearance schedule. An item to be placed on a clearance schedule is an inventory item that the enterprise system no longer wishes to carry or restock. These items may be located in retail stores or online. In-store inventory items may be separately categorized into standard items and seasonal items. For example Halloween candy and Christmas trees may be examples of seasonal items, while a specific children's sleepwear item may be representative of a standard in-store item. In instances where the enterprise system desires to place an inventory item on a clearance schedule, the clearance scheduling system 120 may be configured to maximize revenue rather than pricing items to maintain profit margin, as the inventory has already been purchased and the inventory cannot be returned to the vendor. Seasonal items and standard items may be stocked in the same department within of a retail store or online collection.

Figure 2:
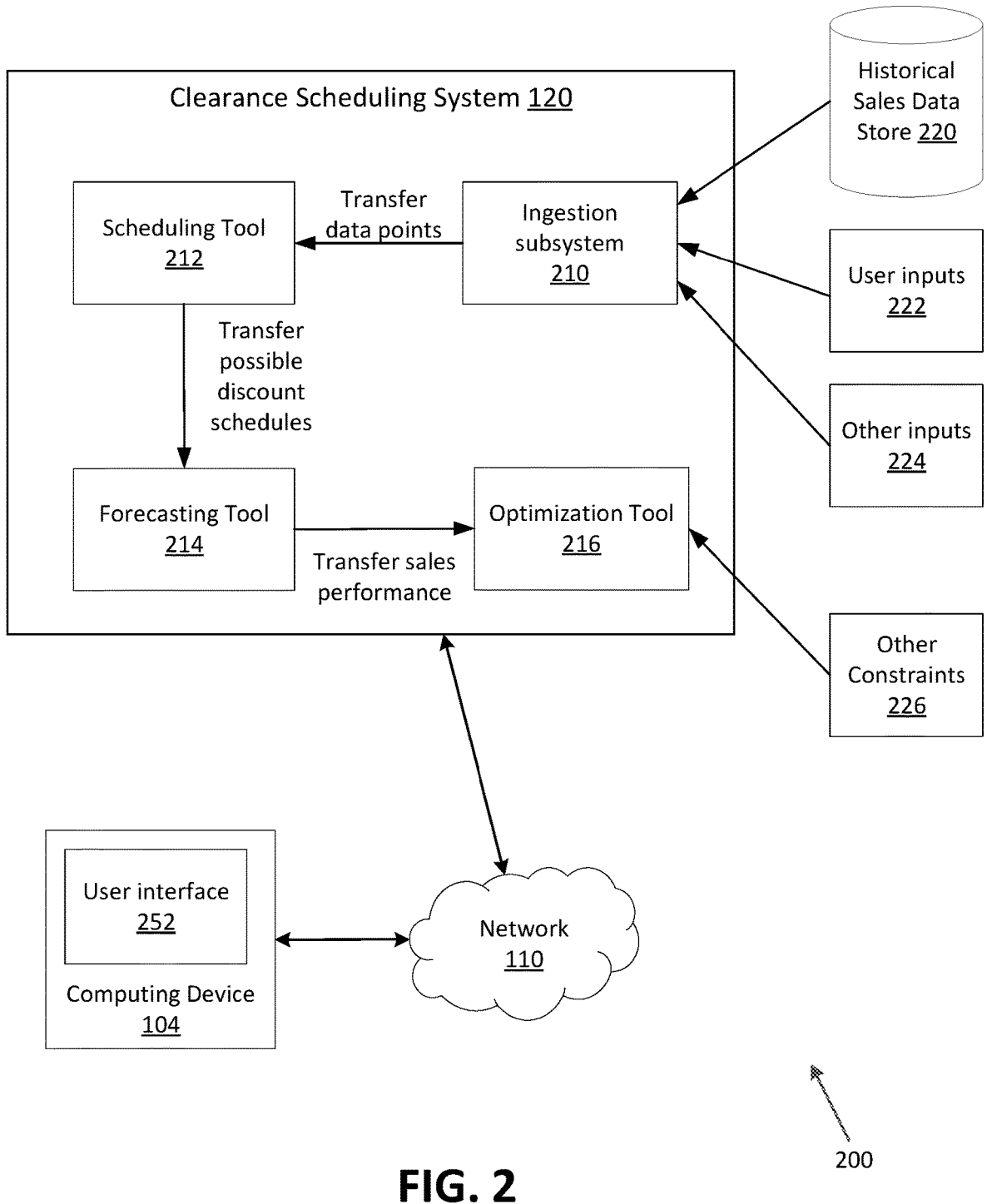
FIG. 2 illustrates an example schematic diagram of an example clearance scheduling system.

FIG. 2 illustrates a schematic diagram of an example system 200 for implementing the clearance scheduling system 120. The clearance scheduling system 120 can be implemented in the form of a software tool executable on a computing device, such as the device seen in FIG. 11. Components of the clearance scheduling system 120 include an ingestion subsystem 210, a scheduling tool 212, a forecasting tool 214, and an optimization tool 216.

In general, the clearance scheduling system 120 starts with receiving, at the ingestion subsystem 210 user inputs 222. User inputs 222 include at least a selection of an inventory item for clearance, a time definition, and a clearance program type.

Once the inventory item is identified, the historical sales data is received from a historical sales data store 220. The historical sales data store 220 includes historical sales data for a plurality of items, organized by department. The historical sales data received is data for the department associated with the selected inventory item to be placed on clearance. In some instances, the historical sales data is data related to fewer than all items within a department, and may or may not include the item to be placed on clearance. In at least some embodiments, the historical sales data does not include sales data for the item to be placed on clearance. For example, the historical sales data may be data associated with clearance sales of items that were previously stocked in the same department.

The time definition represents an overall time within which the optimal clearance schedule will be executed. The time definition includes at least one of: an end date or an elapsed time. Generally, standard in-store inventory items and online items have a time definition that includes an end date, while seasonal in-store items have an elapsed time. Example times may be defined as a total number of weeks for a clearance schedule to be executed.

A clearance program type is digital clearance, seasonal clearance, or in-store clearance. Inventory items fit into only one category of clearance program types.

The ingestion subsystem 210 also receives other inputs 224. Other inputs 224 include a salvage value of the selected inventory item. In an embodiment, a user is able to select an option to minimize salvage as part of the clearance schedule. Other inputs 224 may include shipping costs for online inventory items.

In response to receiving the inputs, the ingestion subsystem 210 provides the data to the scheduling tool 212. The scheduling tool 212 generates a set of possible discount schedules for the selected inventory item. Each possible discount schedule defines a price and an associated price duration. The prices represent progressive, decreasing discounts between a retail price and a predetermined sale level based in part on the salvage value of the inventory item.

The set of possible discount schedules are transferred from the scheduling tool 212 to the forecasting tool 214. The forecasting tool 214 determines a predicted sales performance of the inventory item for each possible discount schedule. The sales performance is based on the historical sales data for the plurality of inventory items in the same department as the selected inventory item. The sales performance is generally relating to items other than the selected clearance item, and may represent regular sales performance or clearance sales performance.

The forecasting tool 214 transfers the sales performance to the optimization tool 216. The optimization tool 216 determines an optimal clearance schedule from among the possible discount schedules based on the comparison of predicted sales performance of the possible discount schedules.

The optimization tool 216 can also take into consideration other constraints 226. The optional clearance constraints 226 are user defined constraints that forces the optimization tool 216 to optimize a clearance objective function with respect to a markdown plan in the presence of the constraints on those variables. Example other constraints include a maximum number of markdowns, a minimum number of markdowns, a maximum limit between two consecutive markdowns, a minimum limited between two consecutive markdowns, a specified markdown percentage for a week, and blocked weeks or days.

Other optional constraints 226 include a schedule of when the markdown will happen. For example, if a user wants a forecast only, or a possible clearance schedule if specified constraints are present. A specified constraint may be that the inventory item must be 30% off by week 4.

After receiving the predicted sales performance of the possible discount schedules and the other constraints and processing them, the optimization tool 216 returns a recommendation, such as an optimized clearance schedule. An example clearance schedule includes a list of each of the weeks in the program with a markdown for that week and a demand forecast for that week. The schedule also includes a projected number of units that will exist in inventory at the beginning of the clearance program, and a predicted number of units that will exist in inventory at each markdown.

The clearance scheduling system 120 is configured to generate clearance schedules for one or more of three different categories of clearance inventory items: online clearance items, seasonal clearance items, and in-store clearance items.

Online clearance includes all digital items and items purchased online, for example, inventory items that are not sold in retail locations. A clearance scheduling system 120 used to create a clearance schedule for an online inventory item considers the shipping costs as an objective function, so the clearance scheduling system 120 can make an informed decision regarding whether or not the salvage the item or to ship it to customers at a clearance price. For online inventory items, the forecasting tool 214 and optimization tool 216 are generally refreshed every week.

Seasonal clearance inventory items includes highly seasonal items, such as Halloween candy, St. Patrick's Day items, Thanksgiving dishes, etc. The lifecycle of seasonal inventory items are generally short, for example only few weeks, and clearance time periods for these items are even shorter (for example, less than one week). The forecasting tool 214 and optimization tool 216 are refreshed daily for in-store seasonal items. Since seasonal inventory items are sold at retail locations, the optimization tool 216 is capable of providing location-based forecasting and recommendations. The clearance schedule is customized for each retail location.

In-store clearance items includes all other items that are not included as online inventory item or seasonal inventory items. For regular in-store inventory items, the forecasting tool 214 and optimization tool 216 are generally refreshed every week.

As described in more detail below at FIG. 10, a user can input a variety of inputs and/or constraints, which are used to determine the optimal clearance markdown schedule. The user interface can be viewed by an administrative user of the clearance scheduling system 120 for implementation. In an example, the user interface can provide a user with access to view and implement the recommended clearance schedule at a particular retail location.

The clearance scheduling system 120 communicates with a computing device 104 through a network 110. The network 110 can be any of a variety of types of public or private communications networks, such as the Internet. The computing device 104 can be any network-connected device including desktop computers, laptop computers, tablet computing devices, smartphones, and other devices capable of connecting to the Internet through wireless or wired connections.

Figure 3:
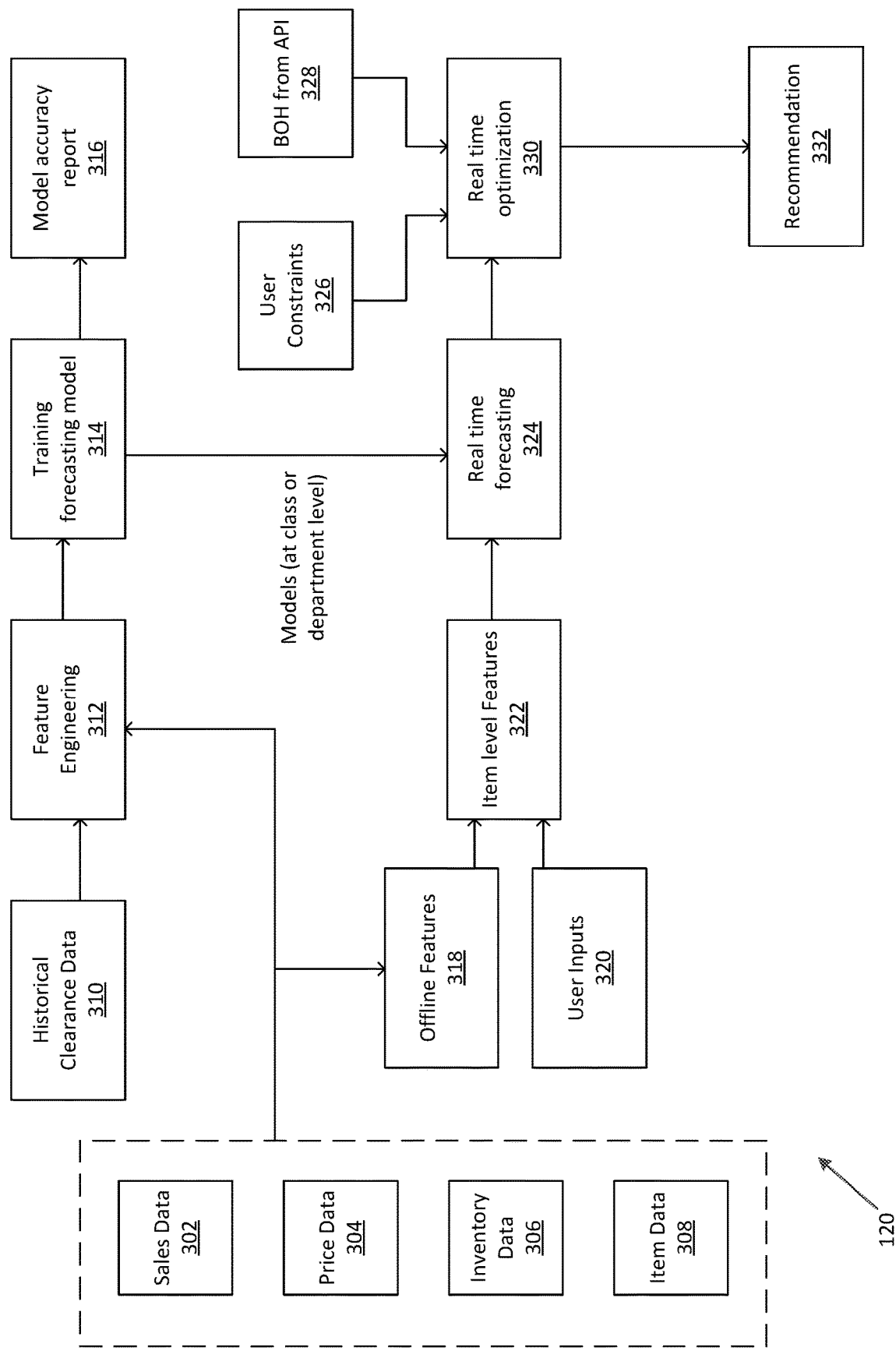
FIG. 3 is a more detailed schematic diagram of the clearance scheduling system of FIG. 2.

FIG. 3 illustrates a more detailed example system of clearance scheduling system 120. The clearance scheduling system 120 includes three main "blocks." The three main blocks include data preparation, forecasting, and optimization.

The main purpose of the first block is to prepare training data for the forecasting tool 214. The training data includes sales data 302, price data 304, inventory data 306, and item data 308. Preparing data also includes updating, as needed, the feature set consumed by the forecasting tool 214. This information can be continually refreshed, so the forecasting tool 214 is able to provide real-time forecasting for inventory items that are sold in-store or online. The data obtained and the processes taking place in the first block can occur off-line because these computations are time-consuming.

The main purpose of the forecasting tool 214 is to predict how many inventory items are expected to sell at a given discount, location, and time period. In order to forecast this information, historical clearance data 310 is gathered. Historical clearance data 310 includes which items went on clearance, what stores were involved, the sales of the inventory item prior to being put on clearance, and return patterns prior to being put on clearance. Additional information gathered includes what the original price of inventory item was, and how much of a discount was offered for the inventory item.

The forecasting tool 214 is trained using historical sales data, for example, using historical sales of previous clearance inventory items. Since clearance items are generally items that will not be restocked by the retail enterprise system, historical clearance data 310 may be used based on clearance sales relating to other similar items (e.g., items from the same department and category) and used as a model to predict the clearance sales for the item to be put on clearance. In example embodiments, forecasting models are trained at the department level or class level. For example, a child's sleepwear outfit is part of the children's clothes department, while Halloween candy is part of a Halloween department. Each of these two examples will exhibit different historical sales patterns, but will exhibit similar historical sales patterns to other inventory items within the same department.

One purpose of the optimization tool 216 is to provide an optimal recommendation 332 to the user regarding a clearance schedule for an inventory item to be placed on clearance. A user can specify clearance program information such as: a list of inventory items to be put on clearance, the clearance program start date, the clearance program duration, possible markdown percentages, and other optimization constraints as required.

The real-time forecasting 324 is triggered by an API, at which time offline features 318 are combined with user inputs 320 to compute an optimized clearance schedule. The real-time forecasting 324 returns expected sales for all combinations of possible markdowns specified by the user for each week (or day) during the clearance program for the inventory item. In an example, the real-time optimizer 330 considers all the combinations of markdown specified with the user and provides a recommended markdown schedule that maximizes revenue.

The method of using the clearance scheduling system 120 shown in FIG. 3 proceeds as follows. First, the data, including sales data 302, price data 304, inventory data 306, and item data 308, is received by a feature engineering tool 312. The feature engineering tool 312 also receives historical clearance data 310. Then the information gathered by the feature engineering tool 312 is passed to the training forecasting model 314. The information gathered by training forecasting model 314 is provided to a model accuracy report 316 and a real-time forecasting tool 324. The training forecasting model 314 can be generated offline. Since the forecasting models are generated offline, forecasting models can be provided at any time.

In the example shown, real-time forecasting 324 also receives inputs from an item level features 322 for a program tool. The item level features 322 for the program tool receives user inputs 320, such as clearance duration, starting date, items for clearance, and locations involved. The user inputs 320 are received in real time at the item level feature 322 for the program tool and are provided to the real-time forecasting tool 324 also in real-time.

A real-time optimizer 330 receives inputs from real-time forecasting 324 as well as user constraints 326 and a beginning on hand inventory (BOH) from an API 328. User constraints 326 include information such as salvage value, a threshold representing the percentage of inventory items remaining by the outdate, a minimum limit between two consecutive markdowns, and a maximum limit between two consecutive markdowns. The real-time optimizer 330 provides a recommendation 332. The recommendation 332 is an output provided to a user, which includes an optimal clearance schedule. The optimal clearance schedule includes markdown percentages arranged per time period.

Algorithms for Forecasting Model

Predicting demand for a clearance inventory item accurately includes training and validating the forecasting model. Therefore, a separate forecasting model is created and trained for each department. The forecasting models are evaluated by calculating various evaluation metrics. Table 1 lists definitions of terms used in the calculations, in one example implementation:

TABLE 1

| | |
|---|---|
| $F_i$ | Forecasted sales |
| $y_i$ | Actual sales |
| $f_i$ | Forecasted value |
| $\bar{y}$ | Average of the actual sales |

In an example implementation for prediction of demand, several evaluation metrics are defined. For example, the error is defined as the difference between the actual value for given actual datum in the data ($y_i$) and the forecast value ($f_i$). Then, to evaluate the performance of the forecasting model, the following four metrics (illustrated herein as equations 1, 2, 3, and 4) are defined.

Equation 1 defines the coefficient of determination. The coefficient of determination is a statistical measure of how close the data are to a fitted regression line. The variables are defined as follows: $f_i$ is forecasted sales, $y_i$ is actual sales, and $y$ is the average of actual sales. The most accurate forecasting model is one that has an $R^2$ value of 1 (e.g., the data matches the fitted regression line).

$$R^2 = 1 - \frac{\sum_{i=1}^{n}(f_i - y_i)^2}{\sum_{i=1}^{n}(y_i - y)^2} \quad (1)$$

Equation 2 is used to determine the mean-squared error. An ideal forecasting model with have a mean squared error value of 0, and any model that produces a value close to 0 is an acceptable model.

$$MSE = \frac{\sum_{i=1}^{n}(f_i - y_i)^2}{n} \quad (2)$$

Equation 3 is used to find the mean-absolute error. An ideal forecasting model will have a mean-absolute error value of 0, and any model that produces a value close to 0 is an acceptable model.

$$MAE = \frac{\sum_{i=1}^{n}|f_i - y_i|}{n} \quad (3)$$

Equation 4 is used to determine the mean absolute percentage error. An ideal forecasting model will have a mean absolute percentage error of 0, and any model that produces a value close to 0 is an acceptable model.

$$MAPE = \frac{\sum_{i=1}^{n}|f_i - y_i|}{y_i} \quad (4)$$

The main purpose in forecasting is to find the model with the best performance. A cross validation is used to measure the performance of each potential model.

The model is fine tuned to find the best set of parameters that work well with the given dataset. One type of top performing model is a gradient boosting model, such as xgboost. When trained across a dataset by department and/or category, such a gradient boosting model has proven more accurate with respect to providing improved $R^2$, MSE, MAE, and MAPE values across clearance types (online, in store, seasonal).

With respect to model selection and tuning, it is noted that the forecasting model is optimized by building a separate forecasting models for each department. The forecasting model is trained by using aggregated sales information from an enterprise sales database, and is repeated on a weekly basis for regular in-store and online clearance inventory items, and daily for seasonal clearance inventory items. Still further, the forecasting model is trained to remove or avoid biased historical sales data.

The forecasting models are trained at an aggregate level (by class or department) to benefit from the similarity between inventory items and avoid sparsity in training data. A Huber Loss Function is used to avoid the reduction of accuracy caused by bias in the historical sales data, particularly, when one inventory item is sold very fast and at a high price point.

The output from the forecasting model is used as the input to the optimization model. The data must therefore be rational. For example, if all the inputs for a particular item to the forecasting model are kept fixed, and the discount offered for that inventory item is increased, there should be an increase in the expected demand generated by the forecast model. However, due to various reasons, such as data sparsity, a naïve machine learning model will not figure this out. To combat this problem, monotonic constraints are used to make sure that an increasing demand with respect to a discount offered for each item is shown.

As explained above, the model is trained at an aggregated level (class or department) to benefit from the similarity between items and avoid sparsity in the training data. The Huber Loss Function is used in the training data to avoid high selling items that may affect the model for the particular item to be placed on clearance. Using the Huber Loss Function may result in loss of signals from the forecasting model on very high selling items. To avoid this effect, a bootstrapping is performed on the training data, wherein the bootstrapping weights are the same as the quantities of the units sold in each observation. So if the number of units sold during clearance is at a 10% quantile for a data point, that data point will receive 10 as its weight. However, if a high selling item is used, that is at 90% quantile of demand, it is assigned a 90. So a high selling item will have a higher weight. By weighting past clearance items in accordance with unit sales, signal loss can be mitigated. This bootstrapping feature may be optionally included in such a simulation based on an option selected by a user when operating the clearance scheduling system 120 of the present disclosure.

Many times, clearance programs are set in the future. This means the user will request an optimization or forecasting for a clearance program at least one week in advance. A formula is used to project the on-hand inventory at the beginning of each program. An example formula is to determine the projected on-hand inventory at the beginning of clearance includes adding the current on-hand inventory (forecast between now and the clearance start data (using forecasting model at 0% off)) and receiving inventory from pending shipments.

Algorithms for Optimization Model

The optimization tool implements a mathematical model and business rules that describe constraints and outcomes of all possible iterations and markdown schedules. The optimization tool provides an output that describes, among all possible combinations of legal markdown choices, a schedule that yields a highest value in the metric it is supposed to be optimizing. For example, the value to be optimized may be revenue, remaining inventory, or other similar values.

In an example, optimization is to maximize total profit or minimize loss. The algorithms used as expressed in a mixed-integer linear program (MILP), and the model is solved in the General Algebraic Modeling System (GAMS).

Sets and parameters of the model used in an example embodiment are defined below.

| Sets: | |
|---|---|
| $tcin_{list}$ | item lists |
| $mkdn_{set\ list}$ | possible markdown percentage |
| $time_{list}$ | possible markdown percentage |
| $\Omega(j, t)$ | locked markdown percentages in given periods |
| $\Psi(t)$ | periods that price should not change from previous period's price |

| Parameters: | |
|---|---|
| $P_{il}$ | regular price of items i at location I |
| $\Theta_{il}$ | shipping cost for item i at location t |
| v | salvage proportion value as a proportion of base price (between 0 and 1) |
| $B_{il}$ | initial inventory level at the beginning of the markdown period |
| $S_{ilt}$ | inventory in transit for item I at location I to arrive at the beginning of time t |
| $D_{iljt}$ | forecasted uncensored demand for item I at location I with markdown j at time t |
| $\gamma$ | minimum required proportion of inventory to be depleted at the end of the clearance period (between 0 and 1) |
| $N_{min}$ | minimum number of time periods to have a markdown |
| $N_{max}$ | maximum number of time periods to have a markdown |
| $\alpha_0$ | minimum MD percentage reduction from one period to the next if a markdown happens (between 0 and 100) |
| $\alpha_1$ | maximum markdown percentage reduction from one period to the next if the markdown happens (between 0 and 100) |
| M | very large number |
| T | indicator of last week, when naming weeks by an integer value |

A further step is to define the decision variables of the optimization model. The variables include a main decision variable ($x_{jt}$), and other variables listed below.

| | |
|---|---|
| $x_{jt}$ | which is a binary variable of 1 if the markdown j is selected for a time period t, otherwise the value is 0 |
| $l_{iljt}$ | the inventory level for item I at location I at the beginning of week t |
| $d_{iljt}$ | realized demand for item I at location I if the markdown j is selected at time period t (minimum of inventory, for example I and uncensored demand, for example D) |
| $y_t$ | binary value 1 if the price is reduced in period t compared to period t-1; 0 otherwise |
| $u_{iljt}$ | binary value to make sure $d_{ilit} = \min(l_{iljt}, d_{iljt})$ |

After the variables are defined, the objective function is described. The set of constraints is set forth below as a mixed integer linear model (equation 5).

$$\max \sum\sum\sum\sum \left(P_{il}\left(1 - \frac{j}{100}\right) - \theta_{il}\right)x_{jt}d_{iLjt} + v\sum\sum P_{il}\left(I_{ilt}x - \sum x_{jt}d_{iLj\tau}\right) \quad (5)$$

Equation 6 is used to represent inventory updates as being limited to decrease in inventory levels.

$$I_{ilt}=I_{il,t-1}+S_{ilt}-\Sigma_j x_{jt-1}d_{ilt-1}, I_{il0}=S_{il0}+B_{il}, \forall i,l, t\geq 1 \quad (6)$$

Equation 7 defines limiting realized demand within available inventory and demand (e.g., because of the lack of restock for clearance items).

$$\Sigma_j x_{jt}d_{ilt}\leq \forall i,l,t\ d_{iljt}\leq D_{iljt} \forall i,l,t \quad (7)$$

Equation 8 describes forcing optimization to pick exactly one markdown for every week.

$$\Sigma_j x_{jt}=1\ \forall t \quad (8)$$

Equation 9 defines the minimum inventory sell through requirement. This is a second objective of the optimization model.

$$\Sigma_j j x_{jt}\geq \Sigma_j j x_{jt-1}, \forall t\geq 1 \quad (9)$$

Equation 10 is an equation for limiting minimum and maximum number of markdowns.

$$N_{min} \leq \sum_{t=1}^{r} y_t \leq N_{max} y_t = \begin{cases} 1: \sum_j jx_{jt} - \sum_j jx_{j,t-1} > 0 \\ 0: \sum_j jx_{jt} - \sum_j jx_{j,t-1} = 0 \end{cases} \quad (10)$$

Equation 11 represents the maximum-minimum percentage price change between markdowns.

$$\Sigma_j j x_{jt}\geq \Sigma_j j x_{jt-1}+\alpha_0-M(1-y_t)\forall t$$

$$\Sigma_j j x_{jt}\leq \Sigma_j j x_{jt-1}+\alpha_1+M(1-y_t)\forall t \quad (11)$$

Equation 12 represents a markdown percentage that is given for a subset of weeks.

$$x_{j,t}=x_{j,t-1}\forall j, t\in\{\Psi\}, j \quad (12)$$

Equation 13 presents an equation for disabling markdowns for some weeks.

$$x_{jt}=1\forall (j,t)\in\{\Omega\} \quad (13)$$

Since two of the decision variables are multiplied together, and the logical constraints have been introduced into the optimization model, the optimization model is a non-linear mixed integer model. The following equations are used to linearize the above model.

First, $x_{jt}*d_{iljy}$ is linearized and is defined as equal to $z_{iljt}$. It is known that $d_{iljt}\leq d_{iljt}$, so the product of the binary and continuous variables are linearized, which results in the following equations, represented as equation 14.

$$z_{iljt}\leq x_{jt}D_{iljt}$$

$$z_{iljt}\leq d_{iljt}$$

$$z_{iljt}\geq d_{iljt}-(1-x_{jt})D_{iljt}$$

$$z_{iljt}\geq 0 \quad (14)$$

After introducing the new variable $z_{iljt}$, the remaining constraints that include $d_{iljt}$ are two of the above linearization constraints and $d_{iljt}\leq d_{iljt}$. To reduce the model dimension and knowing that $d_{iljt}=\min(D_{iljt}, I_{iljt})$; $d_{iljt}$ can be removed and by redefining $z_{iljt}$, equation 15 is solved.

$$z_{iljt}=\min(x_{jt}D_{iljt}, I_{ilt}) \quad (15)$$

Adding the linearization constraints ensures that the new definition holds. This is shown in the set of equations below, defined at equation 16.

$$z_{iljt} \leq x_{jt}D_{iljt} \quad (16)$$

$$\sum_{j=1}^{M} z_{iljt} \leq I_{iljt}$$

$$z_{iljt} \geq = I_{ilt} - M*u_{iljt}$$

-continued $$z_{iljt} \geq x_{jt}D_{iljt} - M*(1-u_{iljt})$$

$$z_{iljt} \geq 0 \text{ and } u_{iljt} \in \{0,1\}$$

This model has logical constraints that cannot be passed to the optimization solver. The logical constraints are again linearized, as shown in equation 17, depicted in FIG. 12. In the first inequality, there is no instance where RHS can be >100. The large number M in the second inequality is needed since the markdown percentage different from one period to the next is most likely <100. M needs to be large enough to ensure RHS>1, so the constraint becomes redundant when $\Sigma_j(jx_{jt}-jx_{j,t-1})>0$, as shown in equation 17, depicted in FIG. 12.

Next, the linear-mixed integer model is defined, as shown below in the set of equations 18

$$\max \sum_i \sum_l \sum_j \sum_t \left( P_{il}\left(1-\frac{j}{100}\right) - \Theta_{il} \right) u_{iljt} + \qquad (18)$$

$$v \sum_i \sum_t P_{il}\left( I_{ilt} - \sum_j u_{iljt} \right)$$

$$I_{ilt} = I_{il,t-1} + S_{ilt} - \sum_j d_{iljt-1}, \ I_{il0} = S_{il0} + B_{il}, \ \forall \ i,l,t \geq 1$$

$$\sum_j d_{iljt} \leq I_{ilt} \forall \ i,l,t \ d_{iljt} \leq x_{jt}D_{iljt} \forall \ i,l,j,t$$

$$d_{ijlt} \geq I_{ilt} - M*u_{iljt} \ d_{iljt} \geq x_{jt}D_{iljt} - M*(1-u_{iljt}) \forall \ i,l,j,t$$

$$\sum_j x_{jt} = 1 \forall \ t$$

$$\sum_t \sum_j d_{iljt} \geq \gamma \left( B_{il} + \sum_t S_{ilt} \right), \ \forall \ i,l$$

$$\sum_j jx_{jt} \geq \sum_j jx_{jt-1}, \ \forall \ t \geq 1$$

$$N_{min} \leq \sum_t y_t \leq N_{max}$$

$$100 \times y_0 \geq \sum_j jx_{j0};$$

$$100 \times y_0 \leq M \times \sum_j jx_{j0};$$

$$100 \times y_t \geq \sum_j (jx_{jt} - jx_{j,t-1});$$

$$100 \times y_t \leq M \times \sum_j (jx_{jt} - jx_{j,t-1}); \forall \ t \geq 1$$

$$\sum_j jx_{jt} \geq \sum_j jx_{jt-1} + \alpha_0 - M(1-y_t) \forall \ t$$

$$\sum_j jx_{jt} \leq \sum_j jx_{jt-1} + \alpha_1 + M(1-y_t) \forall \ t$$

$$x_{j,t} = x_{j,t-1} \forall \ j,t \in \{\Psi\}, j$$

$$x_{jt} = 1 \forall \ (j,t) \in \{\Omega\}$$

Accordingly, the above optimization model selects one optimization from among those optimizations which maximizes revenue over the selected period from among the set of possible clearance pricing schedules that are considered.

Referring now to FIGS. 4-10, details regarding implementation of the clearance scheduling system 120 within the context of a retail enterprise are provided. In general, the above-described modeling tools may be used to assist in developing customized plans for reducing inventory of items designated as clearance items in as efficient a manner as possible, including minimization of salvage efforts and maximizing profit over a given timeframe.

Figure 4:
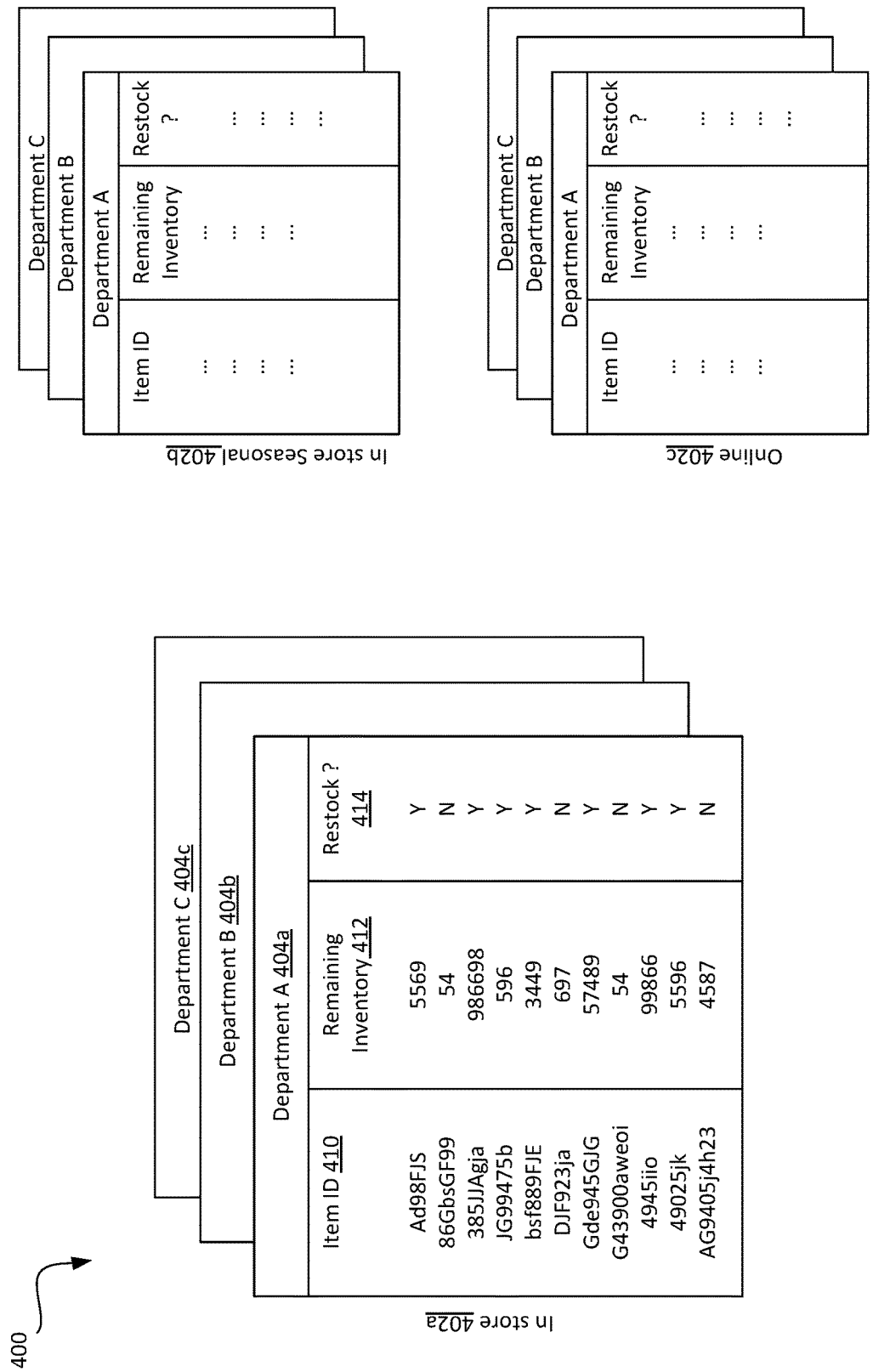
FIG. 4 illustrates an example data set of inventory items of the retail enterprise.

FIG. 4 represents a depiction of all the inventory items 400 for sale within a retail enterprise. In this example, inventory items are separated into three categories: in store 402_a_, in-store seasonal 402_b_, and online 402_c_ inventory items. Within each category 402, inventory items are categorized based on department 404. Each department 404 includes a plurality of inventory items for sale, including both items for standard sale as well as items on a clearance schedule sale. Each inventory item is identified by an item ID 410. The remaining inventory 412 of each inventory item is also listed, as well as whether or not that specific inventory item is being restocked 414 or not. Inventory items that will be restocked are items that are "standard sale" items. Only items that will not be restocked are considered clearance items, and will go through the clearance optimization scheduling process, as described in more detail below. A clearance schedule may be triggered automatically or by a user, also as described in more detail below.

The in-store seasonal 402_b_ and the online 402_c_ categories each also contain inventory items that are separated by department. Each of these inventory items are also identified by item ID 410, include the remaining inventory 412, and whether or not that item is to be restocked 414. As will be described in more detail below each category may be trained by the forecast tool separately, as different categories 402 may include additional or different constraints.

In the example shown, the inventory list of department A 404_a_ has item ID 410 AG9405j4h23 with a remaining inventory 412 of 4587. Item ID 410 AG9405j4h23 will not be restocked 414; therefore, this item is an item that will eventually become a clearance item. In contrast, item ID 410 49025jk will be restocked 414 so this item will not be become a clearance item. While item ID 410 AG9405j4h23 will not be restocked 414 in-store, item ID 410 AG9405j4h23 may be a restocked item online. This is true for all inventory items within the retail enterprise system. Inventory items are treated individually per category, and further per retail store. Different retail stores may stock inventory items differently.

Whether or not an item will be restocked as determines whether the sales of that inventory item as included as historical sales data for the scheduling tool 212 and the forecasting tool 214.

In-store inventory items follow a standard clearance schedule and generally have no additional constraints. In-store seasonal inventory items generally follow a quicker clearance schedule, and therefore tend to have a shorter time period for clearance. The online clearance inventory items include additional constraints such as shipping costs. Further, forecasting may be refreshed at different periods depending on the category, as explained above.

Figure 5:
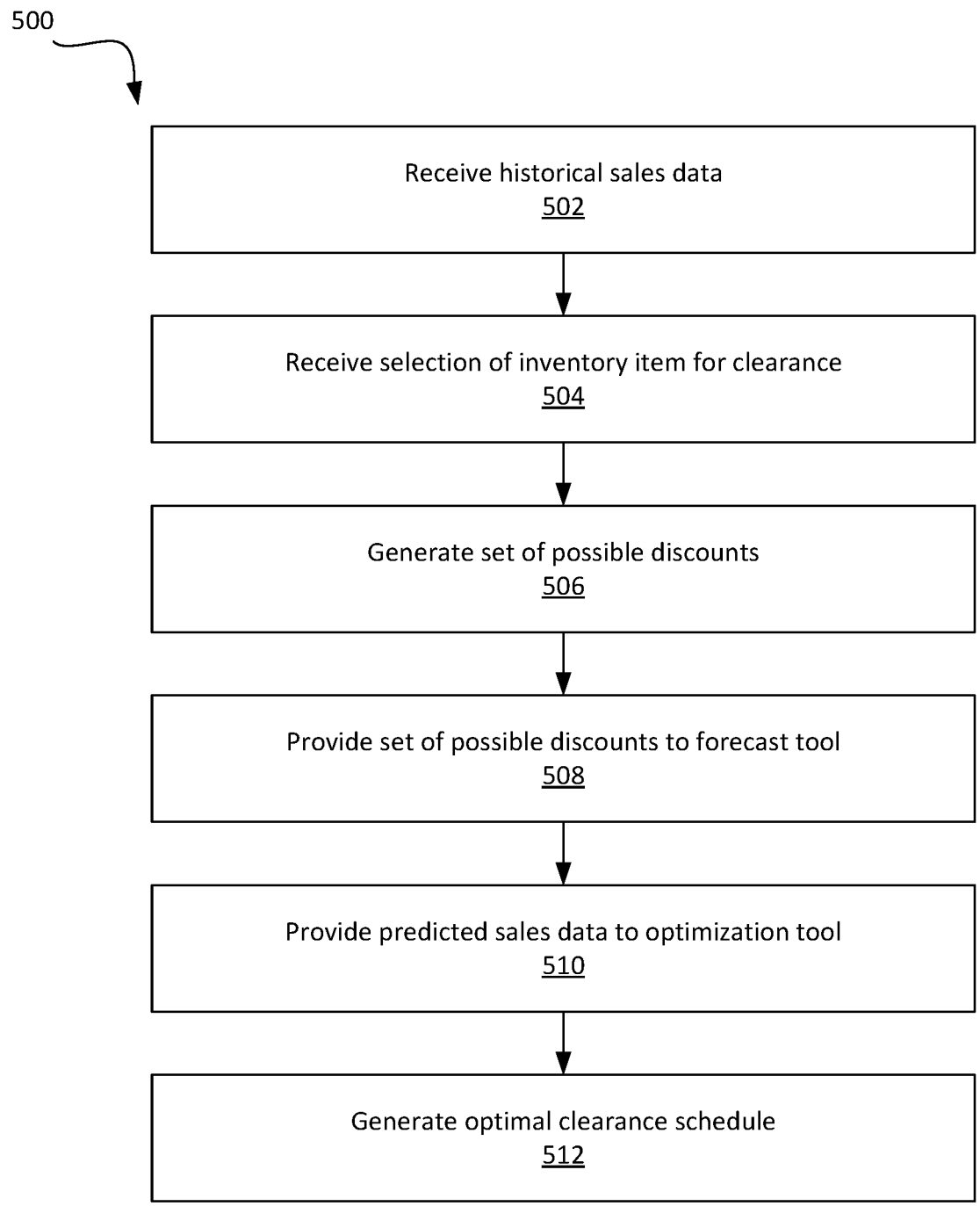
FIG. 5 is a flow chart of an example method of generating a clearance schedule.

The clearance scheduling system 120 utilizes a forecasting tool 214 and an optimization tool 216 as a means for producing a more accurate representative of a clearance schedule than any individual component model. The clearance scheduling system 120 is adjusted over time, increasing accuracy as more data is analyzed. FIG. 5 illustrates an example method of building and using the clearance scheduling system 120.

At operation 502, historical sales data is received. Historical sales data includes at least, sales data for inventory items on markdown for a plurality of inventory items in a department. The sales data can be further categorized by in-store inventory items, seasonal inventory items, and seasonal in-store items.

The historical sales data details how many items were sold at a particular price point. The particular price point is a markdown price point that may or may not be part of a clearance program for the particular inventory item. Further, the markdown price point may be associated with a markdown percentage based on the retail price of the inventory item. For example, item A maybe sold at a reduced price, but the reduced price does not need to be a clearance markdown price in order to use the historical sales data for prediction purposes. The historical sales data for each inventory item is aggregated by department. This is described further in conjunction with FIG. 6.

At operation 504, a selection of inventory items for clearance is received. In a first embodiment, a user may select individual inventory item that is to be put on a clearance schedule. For example, a user communicates via a user interface to select an item to be placed on a clearance schedule. In another embodiment, an inventory item may have an automatic clearance schedule program date. An inventory item may have an automatically scheduled date associated with it, the date determines when a clearance program is to be effective. For example, Halloween candy is automatically tagged to have a clearance schedule start on November $1^{st}$; therefore, the optimal clearance schedule is determined even without a user input.

Receiving a selection of an inventory item for a clearance schedule can also be triggered when inventory levels of a selected item fall below a predetermined level.

At operation 506, a set of possible discount schedules is generated. A discount schedule defines a set of prices along with an associated duration that each price would be effective. The associated prices represents progressive, decreasing discounts between the retail price and a predetermined sales value. The predetermined sales values is a minimum price at which an inventory item is placed for sale to customers. The predetermined sales value is based at least in part on a salvage value of the inventory item. A set of possible discount schedules is generated individually for each inventory item selected.

The decreasing discounts represented in the set of possible discount schedule are commensurate with the legal requirements of selling items on clearance. For example the discount schedule must always proceed in time with decreasing prices, which represents an always increasing clearance markdown percentage. In some embodiments, the set of possible discount schedules is generated by an optimization tool based on constraints received at the clearance scheduling system 120. In particular embodiments, the set of possible discount schedules is automatically generated based on the constraints received from the user, and representing all possible permutations of discount schedules within a user-selected clearance program period.

At operation 508, the set of possible discounts generated is provided to a forecasting tool. The forecasting tool provides a predicted sales performance of a selected inventory item based on the historical sales data for the plurality of inventory items in the same department.

At operation 510, the predicted sale performance data is sent from the forecasting tool to the optimization tool. The optimization tool compiles the information gathered and processed by the forecast tool to generate an optimal clearance schedule. The optimal clearance schedule is one that maximizes revenue based on historical sales data.

At operation 512, the optimal clearance schedule includes a markdown schedule for an inventory item to be placed on clearance including time durations for each markdown. An example optimal clearance schedule is shown at FIG. 10.

Figure 6:
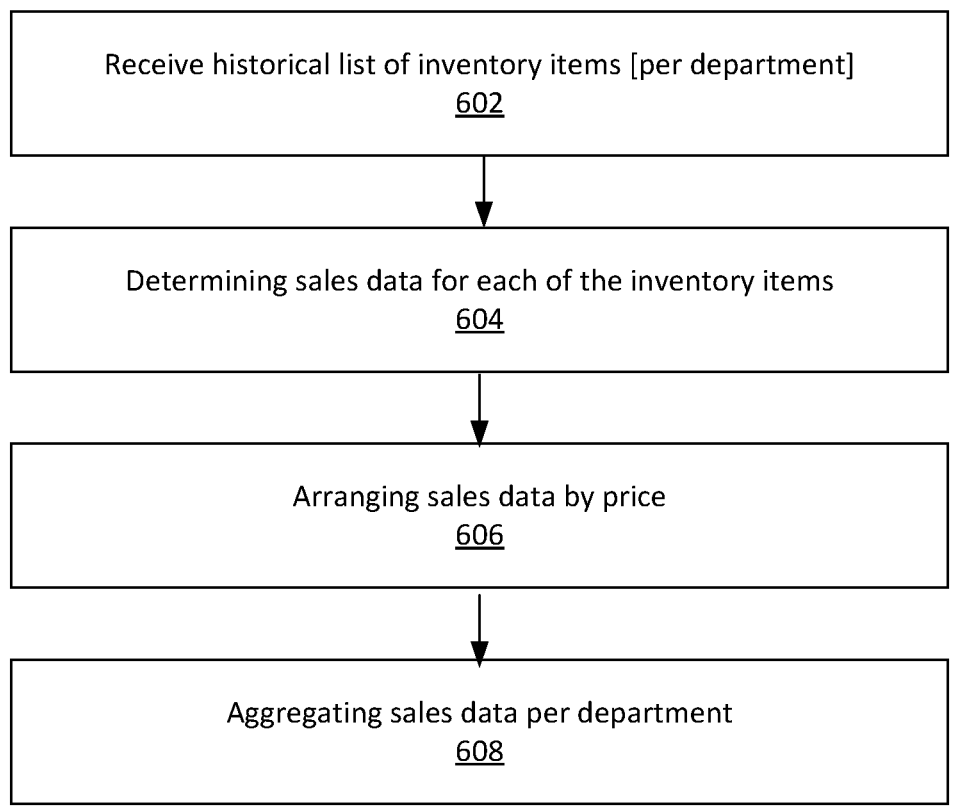
FIG. 6 is a flow chart of an example method of receiving historical sales data.

FIG. 6 illustrates an example method 600 receiving and processing historical sales data. Historical sales data is gathered from inventory items that were sold in the past at a markdown of the retail price.

At operation 602, a list of inventory items sorted by department is received. The list of inventory items can be similar that those shown in FIG. 4. The list of inventory items can include both restock of all inventory items as well as inventory items that were put on clearance in the past. However, in some instances, only inventory items that have been sold at a price less than retail price is included. Included inventory items may, in such an embodiment, include both past clearance items, as well as currently restocked items that were sold at a discount.

At operation 604, the sales data for each of at least a selected set of the inventory items within the department is determined. The sales data represents how many items were sold and the price point at which those items were sold. Sales data may be represented as a total volume of items sold, or the remaining number of inventory items. The price point at which the inventory items were sold may be represented at the actual price, or a percentage of the original retail price.

In an example, inventory items that were placed on clearance in the past would provide sales data that demonstrates how many items were sold at each price as the price decreased. Past clearance inventory items may be used to predict the sales of future clearance inventory items, e.g., by comparing a rate of sale of the item before and after clearance, or otherwise determining an effect of clearance of the item on sales. In another example, inventory items that were sold at a discount, but not as clearance items can be used to predict the sales of that inventory item when placed on clearance.

At operation 606, the sales data is arranged by the actual sales price of the inventory item. Generally, the sales of an inventory item increases when the price is initially decreased, and then as time passes, sales level off. This is shown and explained in more detail at FIG. 9.

At operation 608, the sales data collected for each inventory item sold at a price below the original retail price is aggregated by department. Before aggregating, the sales price for each inventory item is normalized. For example, normalizing the price may be accomplished by using the percentage off original retail price for each inventory item. This is shown and explained in more detail at FIG. 9.

An output is provided that represents sales data for all items in a department. An example output includes that sales at each markdown percentage for individual inventory items, as well as a department average.

Figure 7:
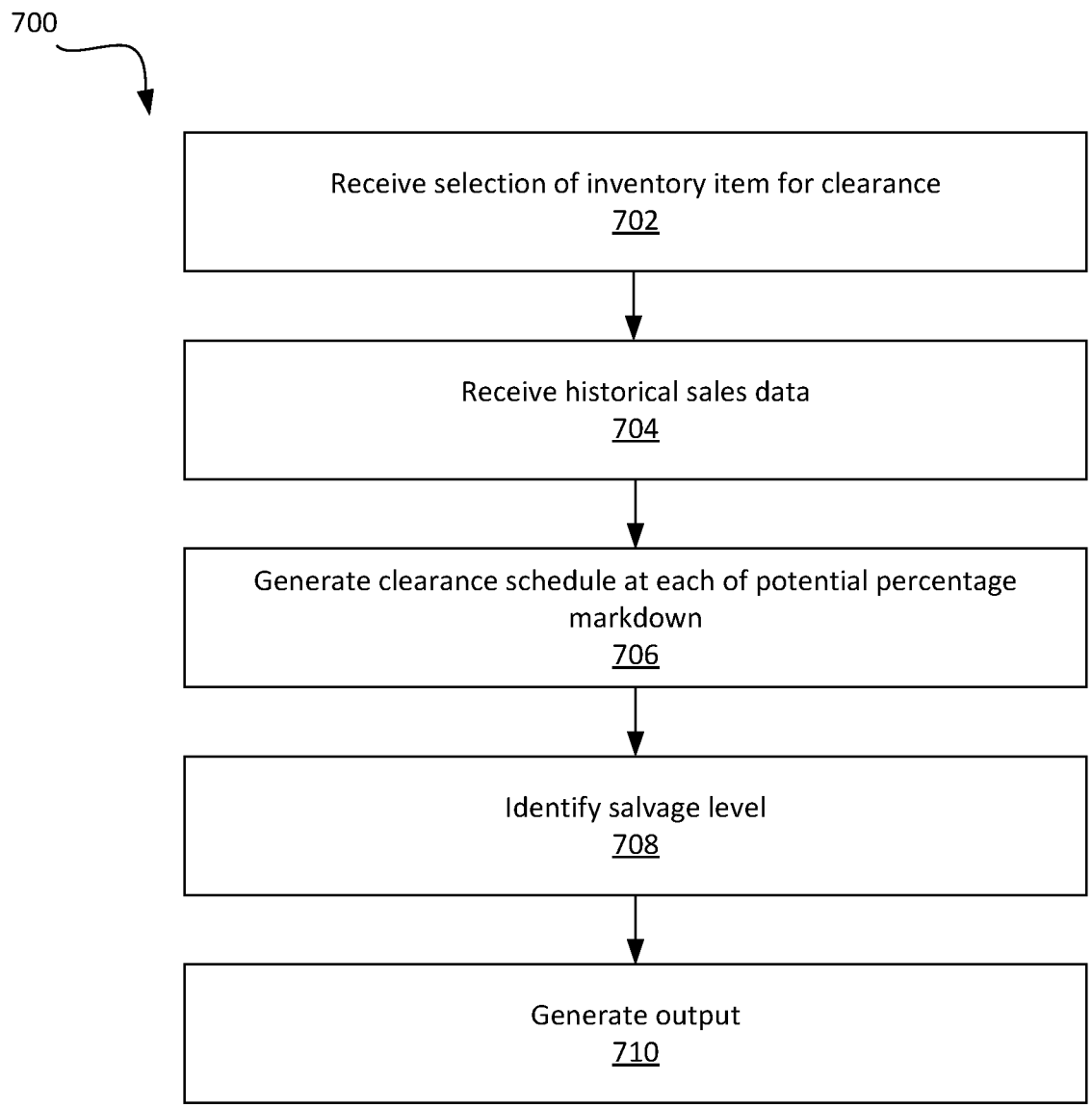
FIG. 7 is a flow chart of generating a set of possible discount schedules.

FIG. 7 shows an example method 700 of generating a set of possible discount schedules from operation 506. This method may be performed by a forecasting tool.

At operation 702, a selection of the inventory item for clearance is received. In a first example, a user manually inputs the inventory item of interest via a user interface. In another example, the inventory item may be automatically selected based on a set of associated factors. Associated factors include putting seasonal inventory items associated with a holiday on clearance the day after the holiday occurs. Another associated factor includes putting seasonal inventory items on clearance after they have been for regular sale for a predetermined period of time.

At operation 704, the historical sales data is received. The historical sales data received is the actual sales at each markdown percentage for the department associated with the selected inventory item. The historical sales data may be normalized across the department, for example, by utilizing markdown percentage of the retail price.

At operation 706, a clearance schedule at each potential markdown percentage is generated. This potential clearance schedule uses the historical sales data to compile a prediction of sales at each potential markdown percentages. The potential clearance schedule generated includes how many inventory items are predicted to be sold at each price point. The potential clearance schedule may also include a time period illustrating how long the inventory items are sold at each price point to achieve maximum sales.

At operation 708 the salvage level of the inventory item is identified. The salvage level is a minimum price at which the inventory items will be sold. The forecasting tool receives the possible discount schedules at each potential markdown percentage and the salvage level. The discount schedules with a markdown percentage that prices the inventory item below the salvage level are discarded, or otherwise removed from consideration. At operation 710, an output is generated. The output includes the discount schedules generated, taking into account the salvage level. In some instances, the salvage level has an associated cost if reached (e.g., a cost to discard salvage items), or may have some small value (a remaining salvage value of the item being removed from inventory). In some cases, both a cost to salvage and an expected salvage revenue may be provided.

Figure 8:
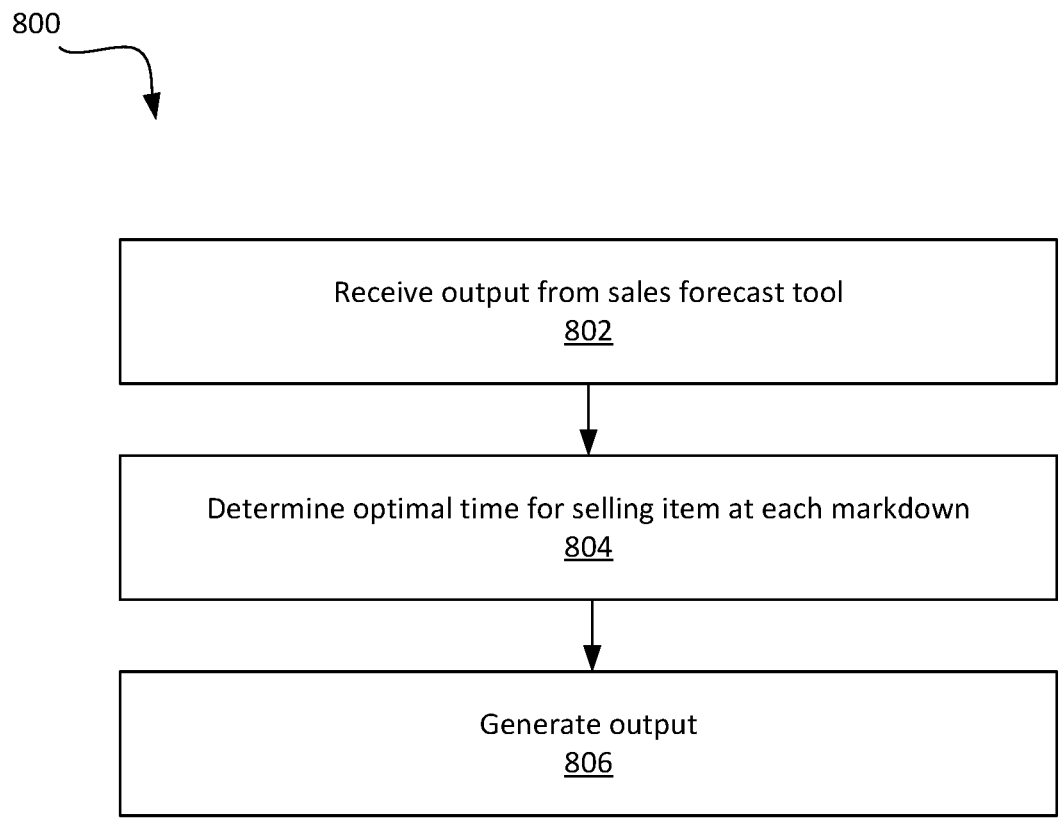
FIG. 8 is a flow chart of generating an optimal clearance schedule.

FIG. 8 illustrates an example method 800 of generating a clearance schedule, as in operation 512 of FIG. 5.

In the embodiment shown, at operation 802 the output from the forecasting tool is received at the optimization tool. The output received includes sales profiles for the item to be placed on clearance at each of a plurality of possible price (discount)points, which are generated at the forecast tool based on a model that is generated from historical sales of the department containing the inventory item.

At operation 804, an optimal time for selling the inventory item at each price point is determined. This may be performed by the optimization tool. The optimization tool utilizes the projected sales at each markdown percentage provided by the forecasting tool to determine an optimal time period associated with each markdown percentage.

Figure 9:
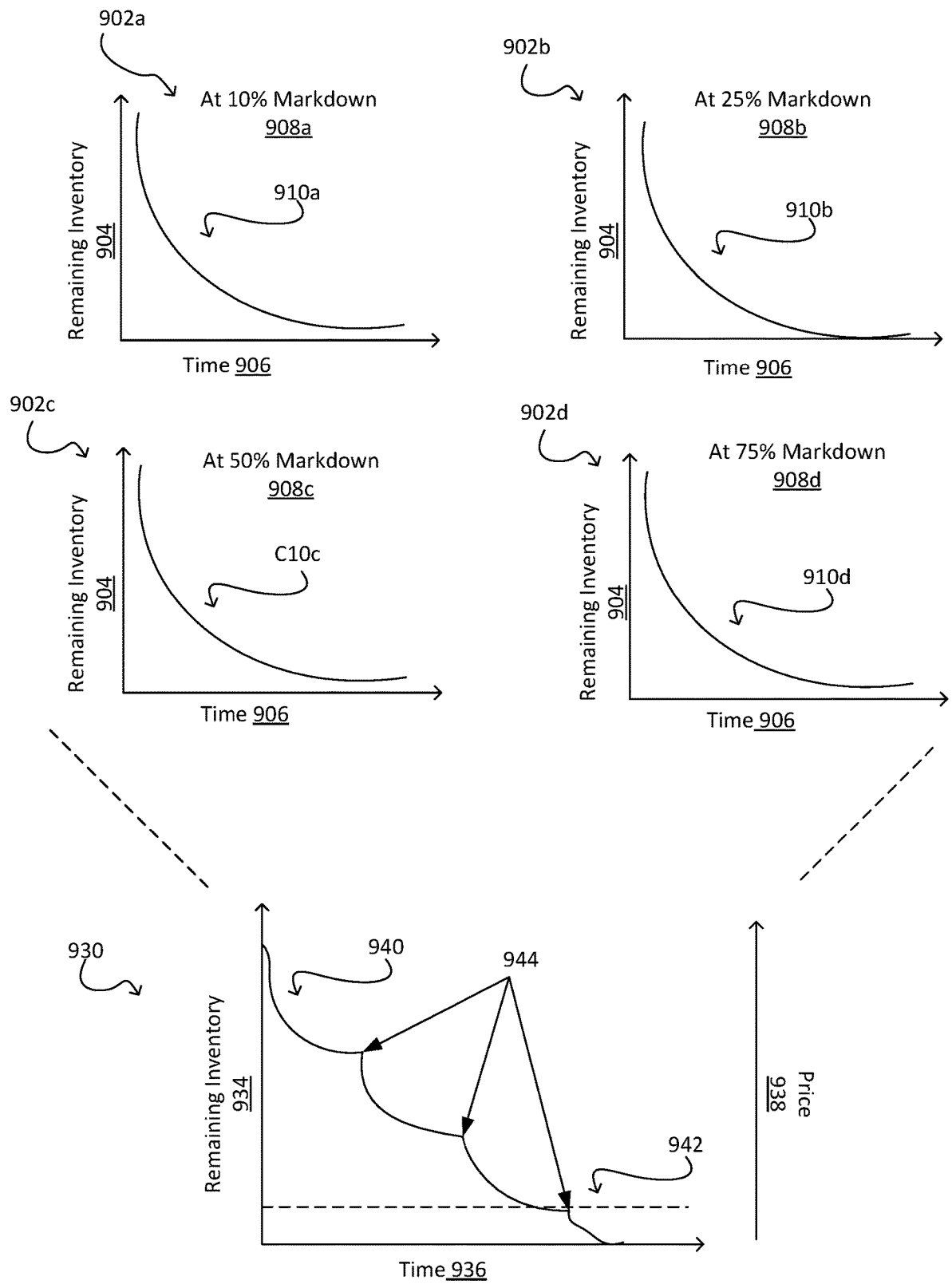
FIG. 9 is an example diagram of historical sales data and predicted optimal sales data.

The optimization tool ultimately determines which discount prices to use and how long the inventory item should be priced at that particular level to optimize sales. As shown in FIG. 9 (and discussed in further detail below), sales of an inventory item spike initially when the price is reduced, and then level off at time passes. Therefore, the optimization tool maximizes the time period where the inventory items is sold at higher volumes, and to minimize the time at which the inventory item is for sale when the sales level off.

At operation 806, an output is generated. The output is provided to a user via a user interface 252. The output includes a time period associated with each markdown percentage. The output may also predict overall sales of the inventory item to be placed on clearance. An example output is shown at FIG. 10, which provides a timeline and associated markdown percentage to the user.

FIG. 9 illustrates an example output of historical sales data graphs 902a, 902b, 902c, 902d, as well as averaged historical sales data graph 930 averaged for a department. This information may be generated by a scheduling tool 212 and provided to the forecasting tool 214 and/or the optimization tool 216.

Historical sales data graphs 902 include a y-axis corresponding to remaining inventory 904 and an x-axis corresponding to time 906. Each historical sales data graph 902 illustrates the remaining inventory 904 as time 906 passes, based on a specific markdown percentage 908. In the example shown, historical sales data graphs 902 are shown for a 10% markdown 908a, 25% markdown 908b, 50% markdown 908c, and 75% markdown 908d. While not shown, any other markdown percentage is contemplated. The sales of the inventory item is shown by the line 910. The sales information is gathered from historical sales data of past inventory items, and is used to predict future sales of inventory items to be put on clearance.

As illustrated in the historical sales data graph 902, sales line 910 of inventory items at specified markdown percentages 908 tends to follow a decay trend. Higher sales tend to occur towards the beginning of a markdown and taper off as time progresses if the inventory item remains at the same markdown percentage 908. The sales 910 is shown as an exponential decay because sales are plotted in regard to remaining inventory (as opposed to total sales).

Averaged historical sales data graph 930 illustrates an example aggregate of the information gathered from historical sales data graph 902. Averaged historical sales data graph 930 includes a first y-axis representing remaining inventory 934 and a second y-axis representing price 938. The x-axis represents time 936. Additionally included in averaged historical sales data graph 930 is a salvage price 942. Salvage price 942 illustrates the price at which the inventory items will no longer be placed for sale, and instead processed as salvage items within the enterprise system.

Averaged historical sales data graph 930 includes a predicted sales curve 940, which is represented as multiple individual exponential decays. Each point 944 is representative of a time 936 at which the markdown percentage of the inventory item has changed. The points 944 also correspond to a price decrease. As time 936 passes (or a time period increases) the curve 940 follows an exponential decay, illustrating that the remaining inventory 934 decrease as price 938 also decreases.

The curve 940 also follows a constantly increasing markdown percentage. Once the inventory item is placed on clearance, the markdown percentage must always increase (resulting in consistently decreasing price).

Figure 10:
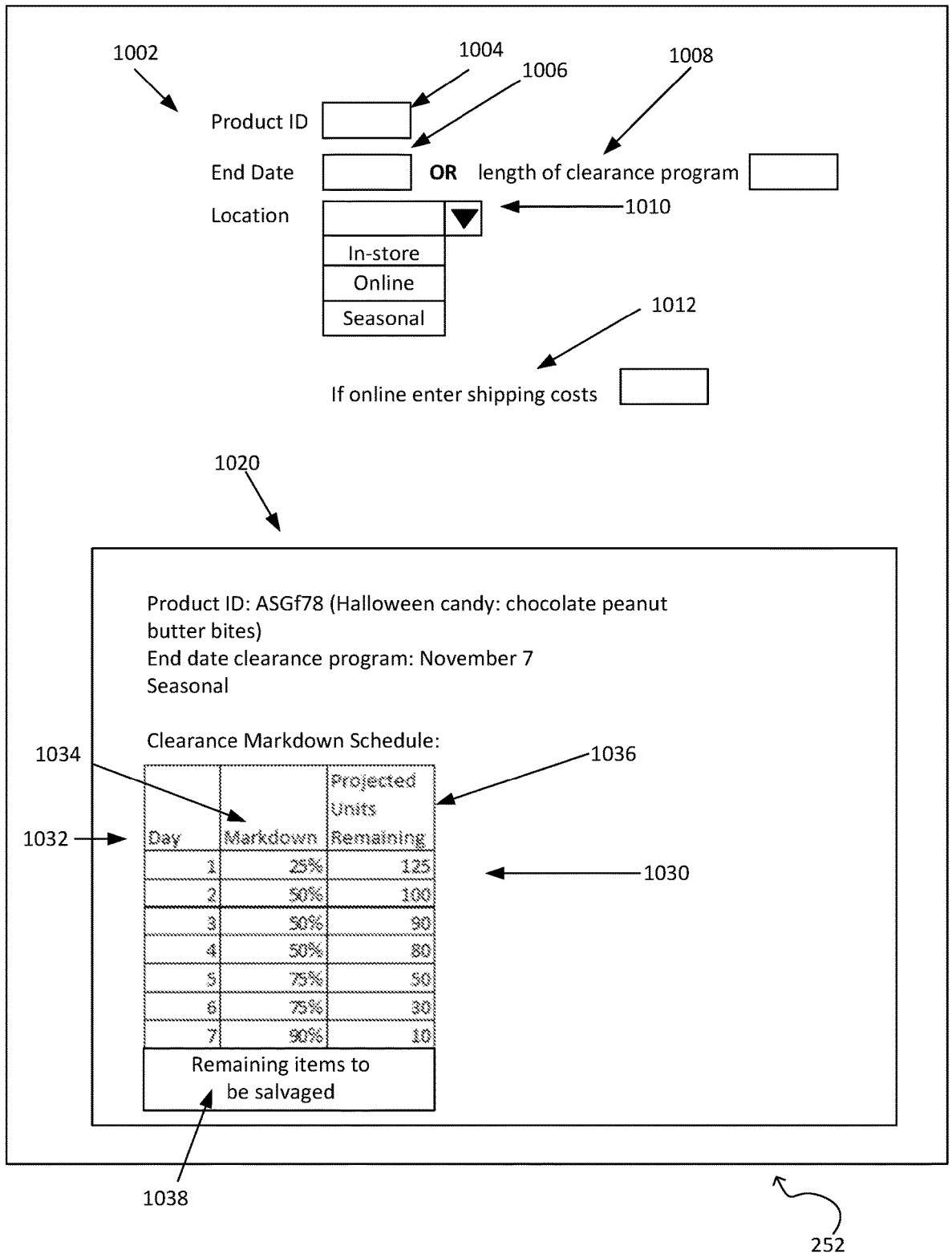
FIG. 10 is an example user interface for a clearance scheduling tool.

FIG. 10 illustrates an example embodiment of a user interface 252. The user interface 252 has multiple inputs 1002 and an output 1020 representing an optimized clearance markdown schedule 1030.

When an inventory item is scheduled to be placed on clearance, a user enters the inventory item product ID 1004. A user is also prompted to enter an end date 1006 of the clearance program, or a length 1008 of the clearance program. Depending on the individual inventory item to be placed on clearance, the retail enterprise may want to have an optimization schedule end at a certain date, or take place for a certain amount of time. For examples, standard in-store inventory items generally are placed on a clearance schedule for 6 weeks, while seasonal inventory items are generally placed on a clearance schedule to end by a specified date.

The user is also prompted to enter a location 1010. A location 1010 is selected from in store, online, or in-store seasonal merchandise. Still further, if the location 1010 is in-store, the user may be prompted to select the specific retail location. Depending on the location of the inventory item to be placed on clearance, the user may need to enter a shipping cost 1012 associated with the product. Generally, a shipping cost 1012 is only applicable to online items. The shipping cost 1012 is factored in by the optimization tool to determine an optimized clearance schedule to maximize revenue for the retail enterprise system.

The user interface also shows the output 1020. The output 1020 includes inventory item details, including the product ID, the length of clearance, and the location of the product as entered by the user. A clearance markdown schedule 1030 is then presented to the user. In the example shown, the product ID is "ASGf78 (Halloween candy chocolate peanut butter bites)." The time period of the clearance program has an end date (seen as November 7), because the product is a seasonal item. The time period corresponds to one week because the clearance program will not start until Halloween is over. The output includes a clearance markdown schedule 1030 including a time 1032, the markdown percentage 1034, and the projected units remaining 1036.

In other examples, the length of the program may be six or eight weeks. The clearance markdown schedule 1030 would measure the time 1032 in weeks and not days. This may be the case, for example, for non-seasonal items (e.g., either online or in-store items).

The clearance markdown schedule 1030 also includes a time for salvaging 1038 the remaining items. Generally, inventory items are salvaged when the markdown drops below a predetermined threshold. The predetermined threshold represents a minimum price at which the inventory items are sold. Alternatively, the inventory items may be salvaged when a predetermined time period has passed.

Figure 11:
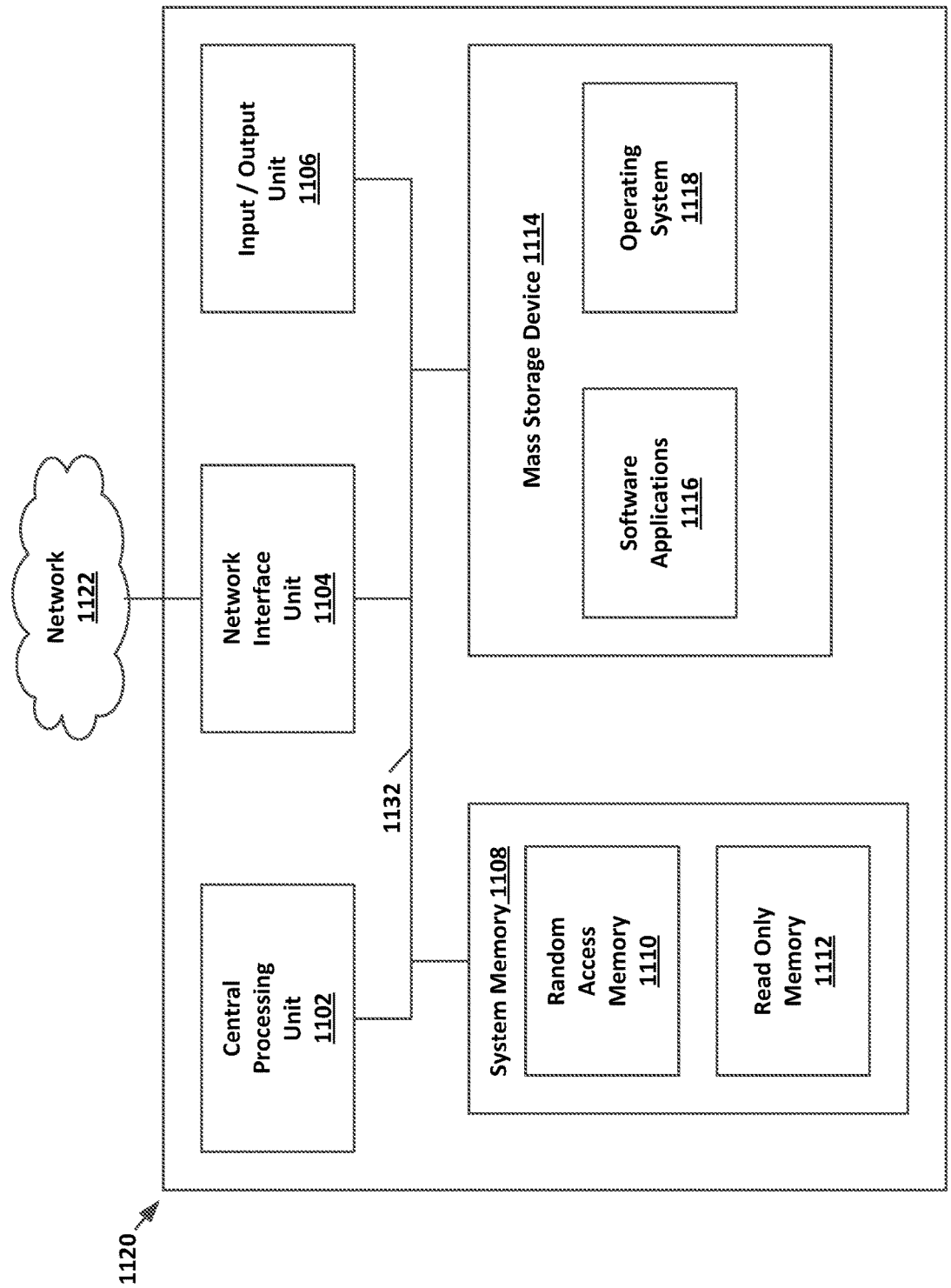
FIG. 11 is an example block diagram of a computing system useful for implementing the clearance scheduling tool.

Referring now to FIG. 11, an example block diagram of a computing system 1120 is shown that is useable to implement aspects of the clearance scheduling system 120 of FIG. 1. In the embodiment shown, the computing system 1120 includes at least one central processing unit ("CPU") 1102, a system memory 1108, and a system bus 1132 that couples the system memory 1108 to the CPU 1102. The system memory 1108 includes a random access memory ("RAM") 1110 and a read-only memory ("ROM") 1112. A basic input/output system that contains the basic routines that help to transfer information between elements within the computing system 1120, such as during startup, is stored in the ROM 1112. The computing system 1120 further includes a mass storage device 1114. The mass storage device 1114 is able to store software instructions and data.

The mass storage device 1114 is connected to the CPU 1102 through a mass storage controller (not shown) connected to the system bus 1132. The mass storage device 1114 and its associated computer-readable storage media provide non-volatile, non-transitory data storage for the computing system 1120. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 1102 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 1120.

According to various embodiments of the invention, the computing system 1120 may operate in a networked environment using logical connections to remote network devices through a network 1122, such as a wireless network, the Internet, or another type of network. The computing system 1120 may connect to the network 1122 through a network interface unit 1104 connected to the system bus 1132. It should be appreciated that the network interface unit 1104 may also be utilized to connect to other types of networks and remote computing systems. The computing system 1120 also includes an input/output controller 1106 for receiving and processing input from a number of other devices, including a touch user interface display screen, or another type of input device. Similarly, the input/output controller 1106 may provide output to a touch user interface display screen or other type of output device.

As mentioned briefly above, the mass storage device 1114 and the RAM 1110 of the computing system 1120 can store software instructions and data. The software instructions include an operating system 1118 suitable for controlling the operation of the computing system 1120. The mass storage device 1114 and/or the RAM 1110 also store software instructions, that when executed by the CPU 1102, cause the computing system 1120 to provide the functionality discussed in this document. For example, the mass storage device 1114 and/or the RAM 1110 can store software instructions that, when executed by the CPU 1102, cause the computing system 1120 to receive and analyze inventory and demand data.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A system for managing clearance inventory items of an enterprise system, the system comprising:

a computing system including a processor, and a memory communicatively coupled to the processor, the memory storing instructions executable by the processor, including a clearance scheduling tool which, when executed, causes the computing system to:
receive a selection of an inventory item for clearance, the inventory item being included in a collection of inventory items of a department of a retailer, the inventory item being different from a plurality of related inventory items;
receive historical sales data including sales data for product markdowns for the plurality of related inventory items in the department, the historical sales data not including sales data for the inventory item for clearance, the department including the collection of inventory items including the plurality of related inventory items;
generate a set of possible discount schedules for the item, each possible discount schedule of the set defining a set of prices and associated price durations, the prices representing progressive, decreasing discounts between a retail price and a predetermined sales level based at least in part on a salvage value of the inventory item;
for at least some of the possible discount schedules, provide the discount schedule to a sales forecast tool that provides a sales performance of the item based on the historical sales data for the plurality of related inventory items in the department;
select an optimal selloff schedule for the inventory item from among the possible discount schedules based on comparison of the sales performance of the possible discount schedules; and
display an output including the selected optimal selloff schedule and a predicted sales forecast for the inventory item, wherein selecting the optimal selloff schedule is performed in response to user selection of a selloff schedule maximizing revenue obtained for the inventory item.

2. The system of claim 1, wherein the sales forecast tool generates a sales forecast for items that are not restocked by the retailer.

3. The system of claim 2, wherein the sales forecast tool exposes an application programming interface (API) accessible by the clearance scheduling tool.

4. The system of claim 2, wherein the clearance scheduling tool is further configured to receive a time definition representing an overall time within which the optimal selloff schedule will be executed.

5. The system of claim 4, wherein the time definition includes at least one of an end date or an elapsed time.

6. The system of claim 2, wherein the clearance scheduling tool is further configured to receive a clearance program type selected from among digital clearance, seasonal clearance, or in-store clearance.

7. The system of claim 6, wherein the clearance program type comprises digital clearance and the clearance scheduling tool is further configured to receive a shipping cost of the inventory item.

8. The system of claim 2, wherein the predetermined sales level is a maximum markdown percentage based, at least in part, in a salvage value of the inventory item.

9. The system of claim 2, wherein the clearance scheduling tool is configured to generate a user interface configured to receive the selection of the inventory item and, in response, display at least the optimal selloff schedule.

10. The system of claim 9, wherein the clearance scheduling tool is configured to receive an option from a user to minimize salvage as part of the optimal selloff schedule.

11. The system of claim 2, wherein the clearance scheduling tool is configured to provide the discount schedule to the sales forecast tool for fewer than all of the set of possible discount schedules.

12. The system of claim 11, wherein one or more discount schedules are excluded from the set of possible discount schedules provided to the sales forecast tool based at least in part on a determination that the one or more discount schedules are unlikely to correspond to the optimal selloff schedule.

13. The system of claim 2, wherein the sales forecast tool generates a sales forecast for items that are not restocked by the retailer.

14. The system of claim 2, wherein the sales forecast tool models an exponential decay in remaining inventory at each of a plurality of price points included in each possible discount schedule.

15. A method of determining an optimal selloff schedule for a clearance inventory item, the method comprising:
receiving, at a clearance schedule tool, a selection of an inventory item for clearance, the inventory item being included in a collection of inventory items of a department of a retailer, the inventory item being different from a plurality of related inventory items;
accessing, at the clearance scheduling tool, historical sales data including sales data for product markdowns for the plurality of related inventory items in a department of an enterprise system, the historical sales data not including sales data for the inventory item for clearance, the department including the collection of inventory items including the plurality of related inventory items;
generating a set of possible discount schedules for the item, each possible discount schedule of the set defining a set of prices and associated price durations, the prices representing progressive, decreasing discounts between a retail price and a predetermined sales level based at least in part on a salvage value of the inventory item;
for at least some of the possible discount schedules, providing the discount schedule to a sales forecast tool that provides a sales performance of the item based on the historical sales data for the plurality of related inventory items in the department;
selecting an optimal selloff schedule for the inventory item from among the possible discount schedules based on comparison of the sales performance of the possible discount schedules; and
displaying an output including the selected optimal selloff schedule and a predicted sales forecast for the inventory item, wherein selecting the optimal selloff schedule is performed in response to user selection of a selloff schedule maximizing revenue obtained for the inventory item.

16. The method of claim 15, further comprising displaying, via the clearance scheduling tool, a clearance program definition screen including an identification of an inventory item, and a duration of a clearance program.

17. The method of claim 16, wherein the clearance program definition screen further includes an identification of a clearance program type selected from among digital clearance, seasonal clearance, or in-store clearance.

18. The method of claim 15, wherein the clearance scheduling tool is configured to, based on the inventory item selected, determine a salvage value of the inventory item.

19. A system for managing clearance inventory items of an enterprise system, the system comprising:
- at least one computing system comprising a processor and a memory communicatively coupled to the processor, the memory storing instructions executable by the processor, including a clearance scheduling tool which, when executed, causes the computing system to:
  - receive a selection of an inventory item for clearance alongside a clearance program type and a clearance program duration, the inventory item being included in a collection of inventory items of a department of a retailer, the inventory item being different from a plurality of related inventory items;
  - receive historical sales data including sales data for product markdowns for the plurality of related inventory items in a department of an enterprise system, the historical sales data not including sales data for the inventory item for clearance, the department including the collection of inventory items including the plurality of related inventory items;
  - generate a set of possible discount schedules for the item, each possible discount schedule of the set defining a set of prices and associated price durations, the prices representing progressive, decreasing discounts between a retail price and a predetermined sales level based at least in part on a salvage value of the inventory item, the price durations aggregating to not exceed the clearance program duration;
  - determine a subset of the possible discount schedules as being possible candidate discount schedules;
  - for each of the possible candidate discount schedules, provide the possible candidate discount schedule to a sales forecast tool that provides a sales performance of the item based on the historical sales data for the plurality of related inventory items in the department;
  - select an optimal selloff schedule for the inventory item from among the possible candidate discount schedules by maximizing revenue performance of the possible candidate discount schedules; and
  - display an output including the selected optimal selloff schedule and a predicted sales forecast for the inventory item, wherein selecting the optimal selloff schedule is performed in response to user selection of a selloff schedule maximizing revenue obtained for the inventory item.

* * * * *